(12) United States Patent
Braun et al.

(10) Patent No.: US 10,822,710 B2
(45) Date of Patent: Nov. 3, 2020

(54) ALUMINIZED METALLIC SCAFFOLD FOR HIGH TEMPERATURE APPLICATIONS AND METHOD OF MAKING AN ALUMINIZED METALLIC SCAFFOLD

(71) Applicant: The Board of Trustees of the University of Illinois, Urbana, IL (US)

(72) Inventors: Paul V. Braun, Savoy, IL (US); Runyu Zhang, Urbana, IL (US); Jessica A. Krogstad, Champaign, IL (US); Jesse P. Angle, Granite Bay, CA (US); Pralav P. Shetty, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 317 days.

(21) Appl. No.: 15/641,822

(22) Filed: Jul. 5, 2017

(65) Prior Publication Data

US 2018/0010257 A1 Jan. 11, 2018

Related U.S. Application Data

(60) Provisional application No. 62/358,626, filed on Jul. 6, 2016.

(51) Int. Cl.
*B32B 15/04* (2006.01)
*C25D 1/08* (2006.01)
(Continued)

(52) U.S. Cl.
CPC .............. *C25D 3/12* (2013.01); *B32B 15/046* (2013.01); *C22C 19/007* (2013.01); *C23C 10/48* (2013.01); *C25D 1/08* (2013.01); *B32B 2266/045* (2013.01)

(58) Field of Classification Search
None
See application file for complete search history.

(56) References Cited

U.S. PATENT DOCUMENTS

| 1,155,974 A | 10/1915 | Tycho Van Aller |
| 3,486,927 A | 12/1969 | Gauje |
(Continued)

FOREIGN PATENT DOCUMENTS

CN 101165204 A 4/2008

OTHER PUBLICATIONS

Kobashi et al., "Effect of elemental powder blending ratio on combustion foaming behavior of porous Al-Ti intermetallics and Al3Ti/Al composites", Intermetallics, vol. 18, Mar. 3, 2010, pp. 1039-1045. (Year: 2010).*

(Continued)

*Primary Examiner* — Xiaobei Wang
(74) *Attorney, Agent, or Firm* — Brinks Gilson & Lione

(57) ABSTRACT

An aluminized metallic scaffold for high temperature applications comprises a porous non-refractory alloy structure including a network of interconnected pores extending therethrough. The porous non-refractory alloy structure comprises a transition metal phase and an aluminide phase, and portions of the porous non-refractory alloy structure between interconnected pores have a thickness no greater than about 500 nm. A method of making an aluminized metallic scaffold for high-temperature applications comprises introducing aluminum into a surface of a porous metallic structure at an elevated temperature. The porous metallic structure comprises a transition metal and has a network of interconnected pores extending therethrough, where portions of the porous metallic structure between interconnected pores have a thickness no greater than about 500 nm. As the aluminum is introduced into the surface and (Continued)

diffusion occurs, an aluminide phase is formed, resulting in a porous non-refractory alloy structure comprising the aluminide phase and a transition metal phase.

13 Claims, 7 Drawing Sheets

(51) Int. Cl.
    *C23C 10/48* (2006.01)
    *C22C 19/00* (2006.01)
    *C25D 3/12* (2006.01)

(56) References Cited

U.S. PATENT DOCUMENTS

| | | | |
|---|---|---|---|
| 7,872,563 B2 | 1/2011 | Braun et al. | |
| 8,237,538 B2 | 8/2012 | Braun et al. | |
| 9,406,938 B2 | 8/2016 | King et al. | |
| 9,571,939 B2 | 2/2017 | Fretz et al. | |
| 2014/0044951 A1* | 2/2014 | Beals | C22C 1/08 428/221 |
| 2014/0221700 A1* | 8/2014 | Radivojevic | B01J 25/02 568/885 |
| 2016/0251979 A1* | 9/2016 | Birnkrant | F01D 25/04 60/725 |

OTHER PUBLICATIONS

Hodge et al., "Measurement and Modeling of Creep in Open-Cell NiAl Foams", Metallurgical and Materials Transactions A, vol. 34A, Oct. 2003, pp. 2353-2363. (Year: 2003).*

Omar et al., "Aluminizing nickel foam by a slurry coating process", Materials Letters, vol. 63, Mar. 16, 2009, pp. 1387-1389. (Year: 2009).*

Wikipedia.org, "Refractory Metals", accessed Aug. 20, 2019, https://en.wikipedia.org/wiki/Refractory_metals (Year: 2019).*

Kumar et al., "A Novel Intermetallic Nickel Aluminide as an Alternative Automotive Body Material", Int'l J. of Engineering and Tech., vol. 11 No. 1, Feb. 2011, pp. 208-215. (Year: 2011).*

Lincoln Machine, "Glossary of Metalworking Terms", https://www.lincolnmachine.com/glossary_metalworking_terms.html, accessed Sep. 25, 2020.*

Aherton, John et al., "Incidents that Define Process Safety," *Center for Chemical Process Safety Design*, John Wiley & Sons, Inc., Hoboken, NJ, USA; doi.org/10.1002/9780470925171.ch3, (2008), 34 pages.

Bahadur, Aruna et al., "Structural Studies of Calorized Coatings on Mild Steel," *Materials Transactions, JIM*, 31, 11 (1990) pp. 948-953.

Bai, Ching-Yuan et al., "Improvement of high temperature oxidation and corrosion resistance of superalloy IN-738LC by pack cementation," *Surface and Coatings Technology*, 183, 1 (2004) pp. 74-88.

Erdeniz, Dinc et al., "Microstructure development during pack aluminization of nickel and nickel-chromium wires," *Intermetallics*, 50 (2014) pp. 43-53.

Goward, G. W. et al., "Pack Cementation Coatings for Superalloys: A Review of History, Theory, and Practice," *Trans. ASME*, 110, 1 (1988), pp. 150-154.

Li, Ning-Ning et al., "Corrosion Behavior of Fe—Al Coatings Fabricated by Pack Aluminizing Method," *Acta Metallurgica Sinica (English Letters)*, 29, 9 (2016) pp. 813-819.

Matijević, Božidar, "A Low Temperature Aluminizing Treatment of Hot Work Tool Steel," *Transactions of Famena*, 37, 1 (2013) pp. 29-34.

Meier, G. H. et al., "Diffusion Chromizing of Ferrous Alloys," *Surface and Coatings Technology*, 39, 40 (1989) pp. 53-64.

Samuel, R. L. et al., "The Protection of Metallic Surfaces by Chromium Diffusion," *Metal Treatment and Drop Forging*, 18, 71 (1951) pp. 354-359.

Smith, Kevin L. et al., "Aluminide Coatings on 304 Stainless Steel," *NACE-International Corrosion Conference Series* (2013) 11 pages.

Wen, Tse-Min et al., "Corrosion behaviour and characteristics of reforming chromized coatings on SS 420 steel in the simulated environment of proton exchange membrane fuel cells," *Corrosion Science*, 52, 11 (2010) pp. 3599-3608.

Xiang, Z.D. et al., "Relationship between pack chemistry and aluminide coating formation for low-temperature aluminisation of alloy steels," *Acta Materialia*, 54, 17 (2006) pp. 4453-4463.

Zhang, Ying, "A Novel Low-Temperature Diffusion Aluminide Coating for Ultrasupercritical Coal-Fired Boiler Applications," Final Scientific/Technical Report for Department of Energy, Award No. DE-FG26-06NT42674, Mar. 2010, 2 pages.

Zhan, Zhaolin et al., "Aluminide Coatings Formed on Fe—13Cr Steel at Low Temperature and its Oxidation Resistance," *Oxidation of Metals*, 68 (2007), pp. 243-251.

Cinca, N. et al., "Thermal spraying of transition metal aluminides: An overview," *Intermetallics*, 24 (2012), pp. 60-72.

Hodge, A.M. et al., "Synthesis of nickel-aluminide foams by pack-aluminization of nickel foams," *Intermetallics*, 9 (2001), pp. 581-589.

* cited by examiner

ALUMINIZED METALLIC SCAFFOLD FOR HIGH TEMPERATURE APPLICATIONS AND METHOD OF MAKING AN ALUMINIZED METALLIC SCAFFOLD

RELATED APPLICATIONS

The present patent document claims the benefit of priority under 35 U.S.C. § 119(e) to U.S. Provisional Patent Application Ser. No. 62/358,626, filed on Jul. 6, 2016, which is hereby incorporated by reference in its entirety.

TECHNICAL FIELD

The present disclosure is related generally to porous metallic structures, and more specifically to porous non-refractory alloy structures for high temperature applications.

BACKGROUND

Porous solids with tailored pore characteristics have attracted considerable attention because of their novel optical, catalytic, sensing, and electrochemical properties. Examples of porous solids employed in industrial applications include photonic crystals and photonic bandgap materials, separation membranes, mesoporous molecular sieves, and metallic foams. Porous metals in particular are widely used in energy conversion or storage devices, as filters, as catalyst supports, as electromagnetic wave absorbers, and as biomedical scaffold materials. Due to challenges with thermal stability, such porous metals have not found extensive application in high temperature structural applications.

BRIEF SUMMARY

An aluminized metallic scaffold for high temperature applications comprises a porous non-refractory alloy structure including a network of interconnected pores extending therethrough. The porous non-refractory alloy structure comprises a transition metal phase and an aluminide phase, and portions of the porous non-refractory alloy structure between interconnected pores have a thickness no greater than about 500 nm.

According to one embodiment, a method of making an aluminized metallic scaffold for high-temperature applications comprises introducing aluminum into a surface of a porous metallic structure at an elevated temperature. The porous metallic structure comprises a transition metal and has a network of interconnected pores extending therethrough, where portions of the porous metallic structure between interconnected pores have a thickness no greater than about 500 nm. As the aluminum is introduced into the surface and diffusion occurs, an aluminide phase is formed, resulting in a porous non-refractory alloy structure comprising the aluminide phase and a transition metal phase for high-temperature applications.

According to another embodiment, the method comprises introducing aluminum into a surface of a porous metallic structure at a temperature of about 700° C. or less. The porous metallic structure comprises nickel and has a network of interconnected pores extending therethrough. As aluminum is introduced into the surface and diffusion occurs, a $Ni_3Al$ phase is formed, resulting in a porous nickel-base alloy structure including the $Ni_3Al$ phase and a nickel phase for high-temperature applications.

DETAILED DESCRIPTION

The present disclosure describes a low-temperature method to introduce aluminum into (or "aluminize") porous metallic structures having submicron-scale porosity to induce strengthening due to the formation of aluminide phases. The porous metallic structures—or metallic scaffolds—may have tunable structural periodicity from submicron to micron length scales. The introduction of aluminum into metallic scaffolds may lead to the formation of desirable aluminide phases that can play a crucial role in maintaining the physical integrity of the scaffolds at temperatures up to 1000° C., in addition to improving the mechanical properties relative to metallic scaffolds that have not been aluminized. The aluminization process leads to a non-refractory metal alloy structure that has properties intermediate to metals and ceramics and which may have advantages of both; for example, the aluminized scaffold may be both electrically conductive and highly thermally stable.

Generally speaking, the aluminized metallized scaffolds may exhibit improved thermomechanical, optical, chemical, and other properties compared to traditionally-used stochastic foams with much larger-scale structures. 3D mesostructured metals that contain large surface areas and open porosity have proven to be useful in catalysis and energy storage applications. With the enhancement in properties after chemical modification with aluminum, the porous metallic structures described herein may be exploited for other demanding applications, such as thermophotovoltaics and hydrophobic structural coatings. The non-refractory alloy scaffold is surprisingly effective for high-temperature applications and further offers a significant cost savings potential.

Figure 1A:
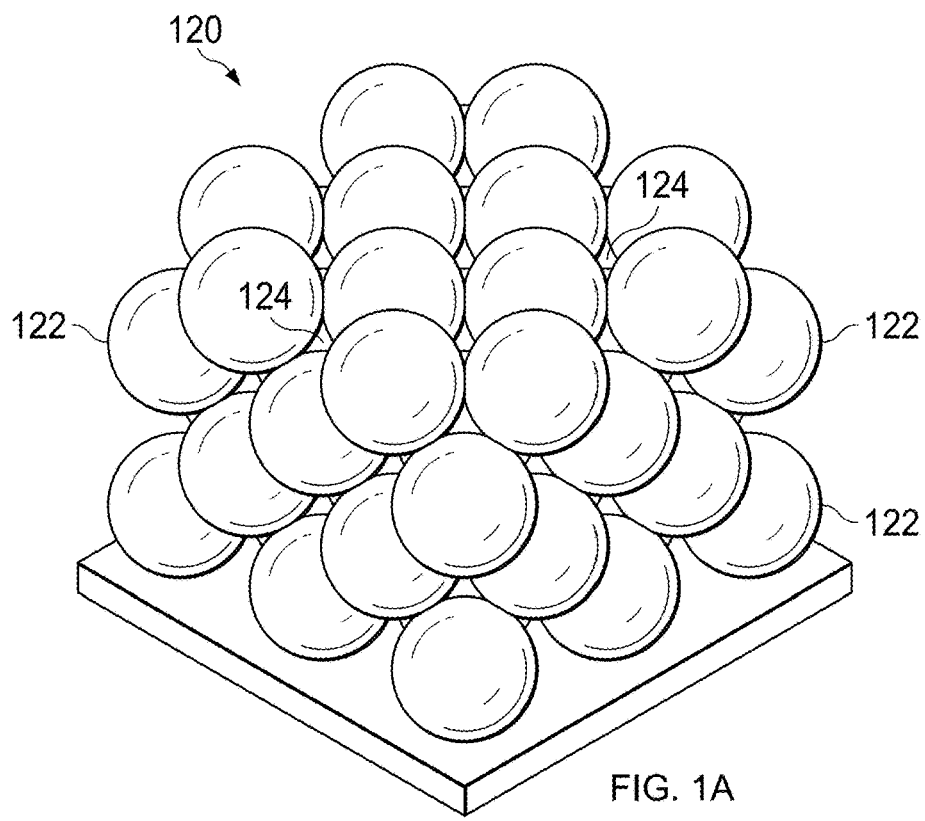
FIGS. 1A-1C show steps of an exemplary fabrication process for a porous metallic structure.
Figure 1B:
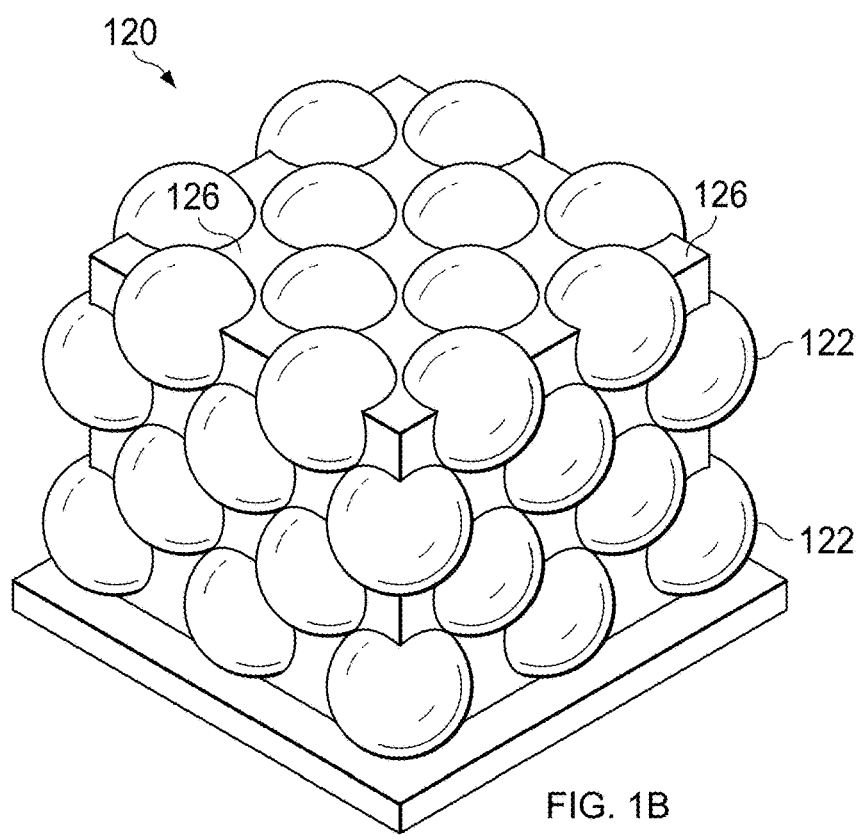
Figure 1C:
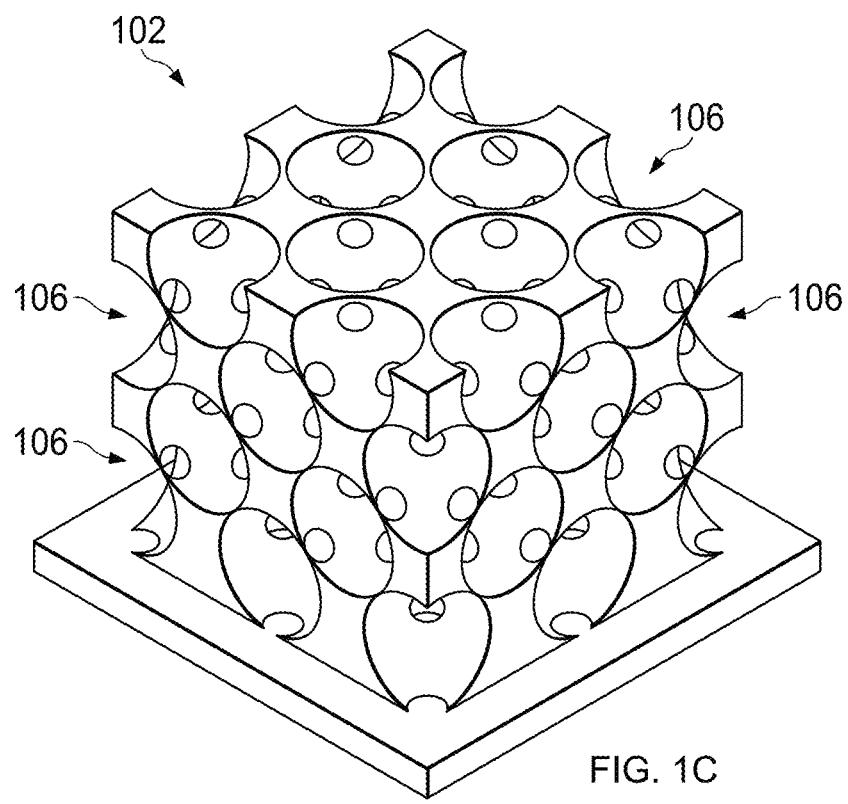
Figure 1D:
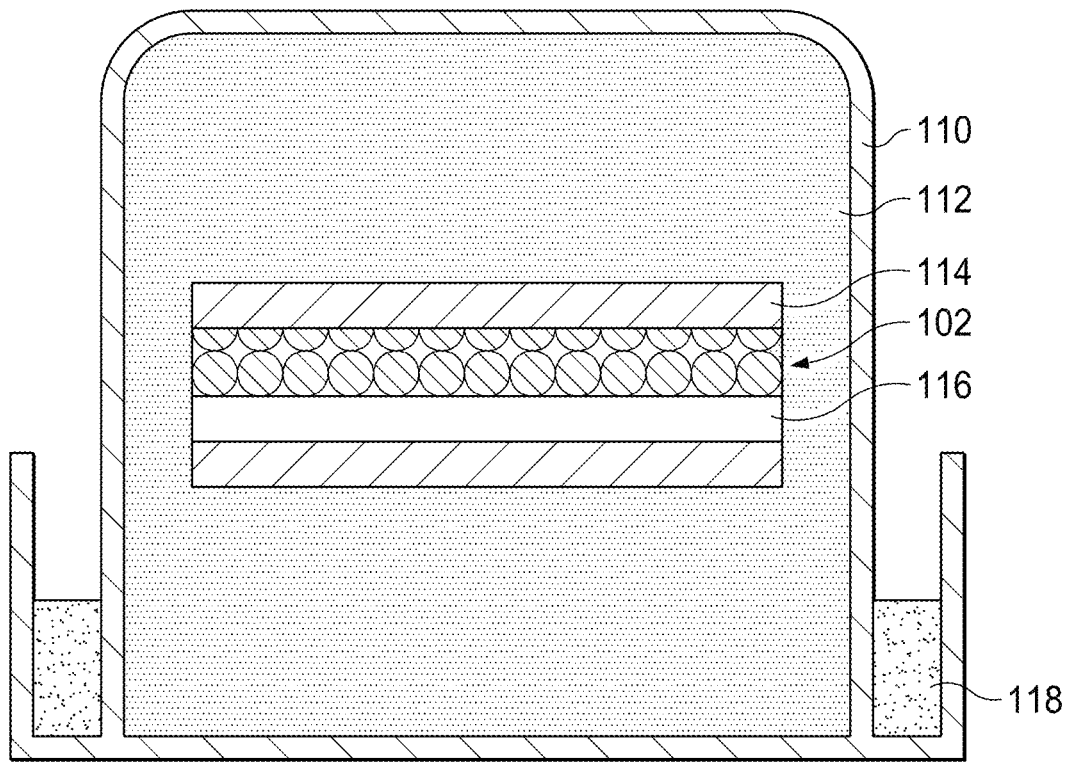
FIGS. 1D and 1E show an exemplary aluminization process to fabricate an aluminized metallic scaffold for high temperature applications from the porous metallic structure formed in FIGS. 1A-1C.

FIGS. 1A-1C are schematics showing an exemplary fabrication scheme for a porous metallic structure 102, and FIG. 1D shows aluminization of the porous metallic structure 102 to produce a porous non-refractory alloy structure 104 (shown in FIG. 1E) that is suitable for high-temperature applications. In the experimental examples in this disclosure, the porous metallic structure 102 comprises nickel, but the aluminization method may be more broadly employed with other transition metals, including titanium, iron, vanadium, chromium and/or cobalt. Suitable transition metals are able to form aluminides and preferably can be electrodeposited. FIG. 2A shows a scanning electron microscope (SEM) image of an exemplary nickel scaffold prior to aluminization and FIG. 2B shows a SEM image of the same scaffold after aluminization.

Figure 1E:
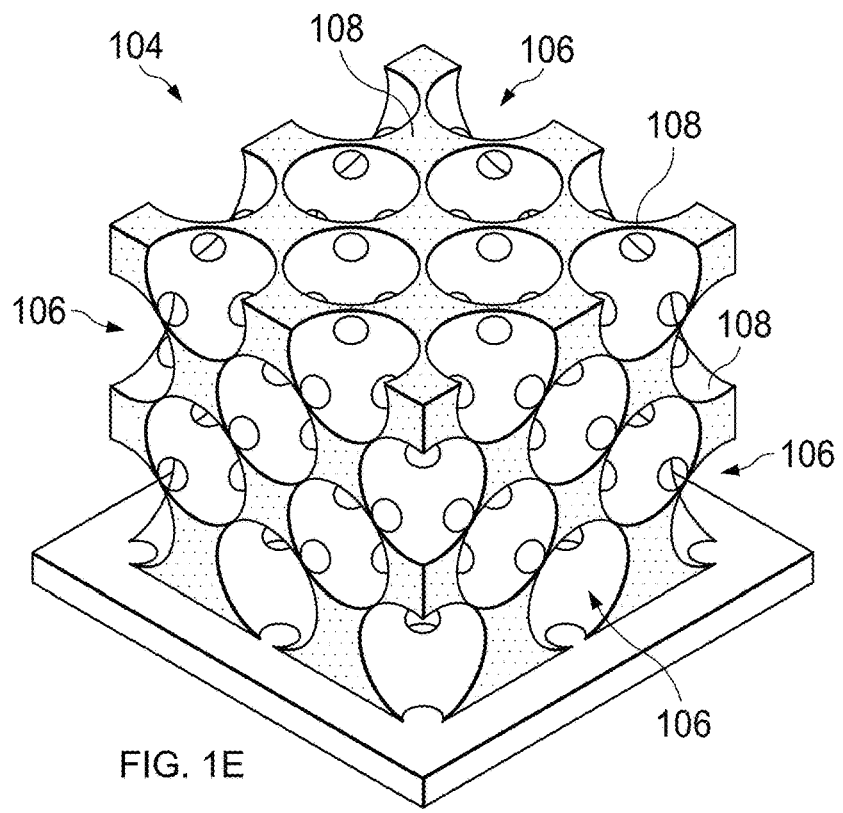
Figure 2A:
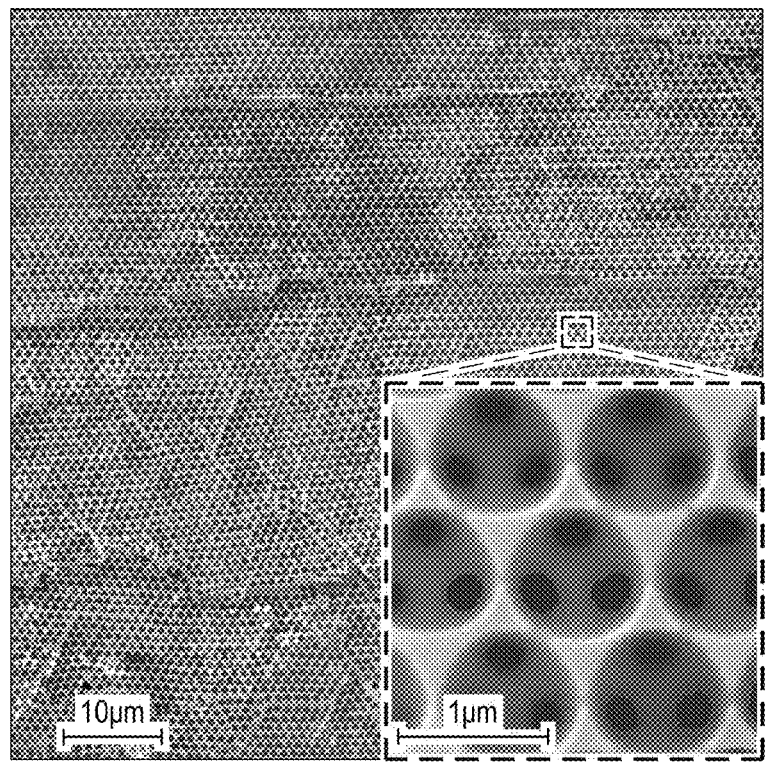
FIG. 2A shows a scanning electron microscope (SEM) image of an exemplary porous nickel structure prior to aluminization.
Figure 2B:
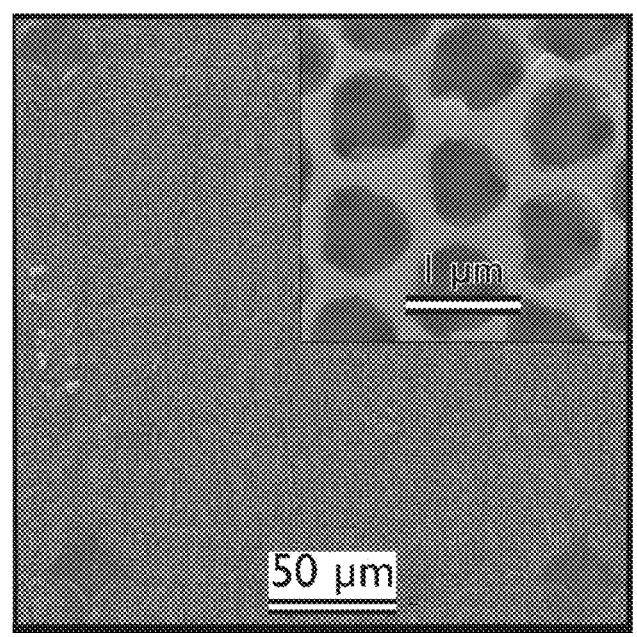
FIG. 2B shows a SEM image of an exemplary porous nickel structure after undergoing aluminization to form an aluminized metallic scaffold. The three Vickers microhardness indents that can be observed in corners of the micrograph are used as fiducial markers for subsequent imaging.

Returning to the schematic of FIG. 1E, an aluminized metallic scaffold 100 for high temperature applications comprises a porous non-refractory alloy structure 104 having a network of interconnected pores 106 extending therethrough. The porous non-refractory alloy structure 104 comprises a transition metal phase and an aluminide phase, and portions 108 of the porous non-refractory alloy structure 104 between the interconnected pores 106 have a thickness no greater than about 500 nm. These portions 108 may be considered to be struts or trusses of the porous non-refractory alloy structure.

It is understood that the network of interconnected pores may alternatively be described as open porosity or open cell pores in the porous metallic structure (or the porous non-refractory alloy structure), in contrast to closed porosity or closed cell pores. When the term "porous structure" is used in the present disclosure, it is understood that it refers to both or either of the porous metallic structure 102 and the porous non-refractory alloy structure 104 formed upon aluminization. The porous structure 102,104 may have a submicron-scale pore size, where each of the interconnected pores 106 is about 1 μm or less in lateral size (e.g., width or diameter). For example, each of the pores 106 may be about 500 nm or less in lateral size or about 300 nm or less in lateral size, and typically each pore 106 is at least about 100 nm in lateral size. Consistent with this fine-scale structure, the thickness of portions 108 of the porous structure 102,104 between interconnected pores may be in some cases no greater than about 300 nm, no greater than about 100 nm, or no greater than about 50 nm. The micro- or nanoscale structure of the metallic scaffold provides a high surface area-to-volume ratio, which ensures that the aluminum can diffuse throughout the thickness of the scaffold—even at relatively low aluminization temperatures, as discussed below. Accordingly, the aluminide phase may be distributed throughout the porous non-refractory alloy structure 104. Preferably, the distribution is highly uniform. The aluminide phase may take the form of discrete, fine-scale precipitates (e.g., submicron- or nanoscale particles) distributed in a matrix comprising the transition metal phase. Such a microstructure is known to contribute to what is known as precipitation hardening in metal alloys. Regardless of the uniformity, the distribution of the aluminide phase in the porous non-refractory alloy structure 104 does not exhibit a stepwise gradient as a function of thickness. In other words, the porous non-refractory alloy structure 104 does not have a chemically layered microstructure in a thickness direction away from a given surface, where the aluminide phase appears (only) in one layer and the transition metal phase appears (only) in another layer farther from the given surface. Such a chemically layered microstructure might be expected with a coating process or if insufficient diffusion occurs during aluminization, but that is not the case with the disclosed method.

The transition metal phase of the porous non-refractory alloy structure 104 may be a nickel phase, a titanium phase, an iron phase, a vanadium phase, a chromium phase or a cobalt phase. It is understood that the transition metal phase comprises a transition metal (e.g., a nickel phase comprises nickel) and has the crystal structure of the transition metal. The transition metal phase may further comprise some amount of aluminum in solid solution. It is also possible that one or more additional alloying elements (e.g., other transition metal(s)) may be present in the transition metal phase in some amount. The transition metal phase may also or alternatively include a residual amount (e.g., less than 0.1 wt. %) of incidental impurities.

The aluminide phase may comprise a nickel aluminide, a titanium aluminide, an iron aluminide, a vanadium aluminide, a chromium aluminide, or a cobalt aluminide. As would be recognized by the skilled artisan, the aluminide phase comprises an intermetallic compound including the transition metal ("M") and aluminum (Al). Exemplary aluminide phases may be represented by a chemical formula such as $M_3Al$, $MAl$, $M_2Al_3$, $M_5Al_3$ or $MAl_3$, where M is Ni, Ti, Fe, V, Cr, or Co. In some cases, it may be beneficial for the porous non-refractory alloy to include more than one aluminide phase. For example, a titanium-base alloy may include a titanium phase along with the aluminide phases $Ti_3Al$ and $TiAl$. In a preferred example, the porous non-refractory alloy structure 104 comprises a porous nickel-base alloy structure that includes a nickel phase and a $Ni_3Al$ phase, the latter of which may enhance elevated temperature stability. Advantageously, the porous nickel-base alloy structure may not comprise a $Ni_2Al_3$ phase, which may be brittle and may impair the mechanical properties of the scaffold.

Figure 3:
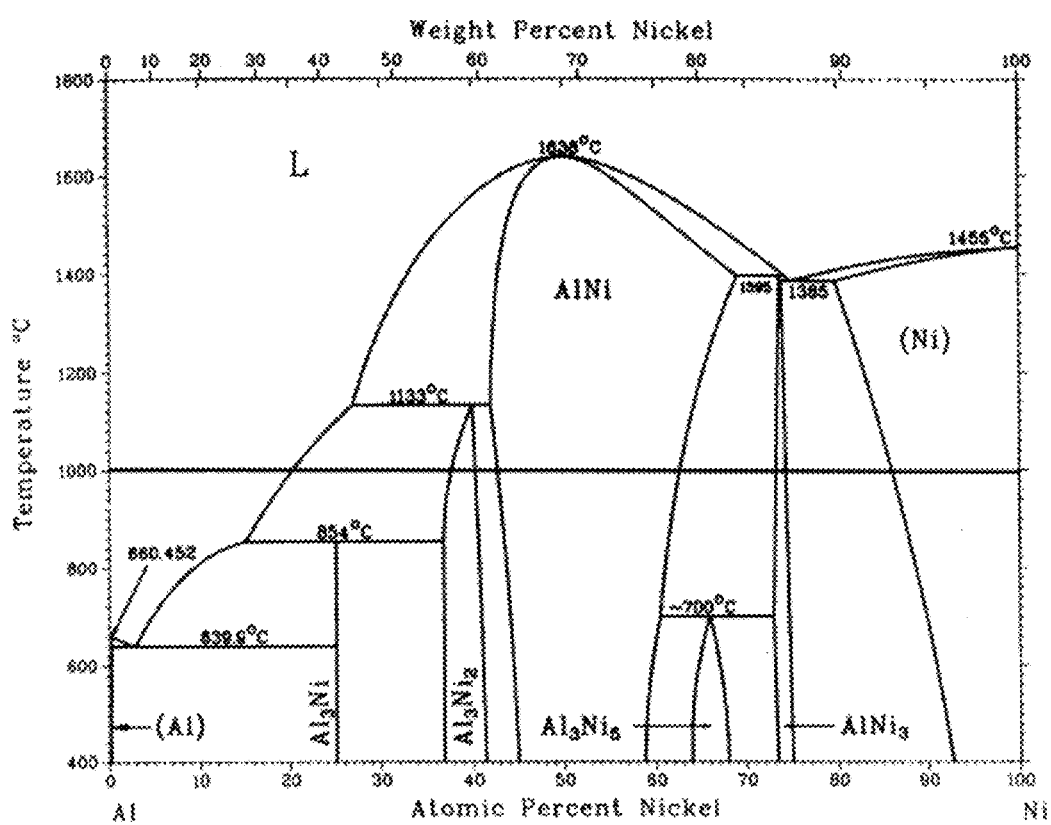
FIG. 3 shows a binary phase diagram for the nickel-aluminum alloy system.

When the transition metal is nickel, the porous non-refractory alloy structure 104 may include aluminum at a concentration from about 8 at. % to about 25 at. %. This is the amount of aluminum suitable for arriving at the exemplary Ni—$Ni_3Al$ phase composition of the aluminized nickel scaffold using the method described herein, as may be verified by reviewing the Ni—Al phase diagram, which is shown in FIG. 3. Other suitable amounts of aluminum for aluminizing other transition metals may be determined in view of the respective M-Al phase diagrams.

Due to the precipitation hardening effect of the aluminide phase, the porous non-refractory alloy structure 104 may exhibit a hardness at least 80% higher than that of a comparative porous metallic structure consisting essentially of the transition metal phase. For example, the hardness of a porous nickel-base alloy structure comprising a nickel phase and a $Ni_3Al$ phase may be at least about 250 MPa, as revealed in FIG. 9B, which is discussed further below.

Due to the deterministic fabrication process of the metallic scaffold (prior to metallization), which is described in detail below, combined with minimal or no dimensional changes to the scaffold during aluminization, the porous non-refractory alloy structure 104 may have a predetermined periodicity and pore structure. For example, the porous non-refractory alloy structure 104 may have the inverse opal morphology and periodic pore arrangement shown in FIG. 1E. The periodic geometry possible with the microstructured metallic scaffolds developed in this work allows for a more predictable material response to various external stimuli.

The aluminized metallic scaffold may also or alternatively be highly uniform. For example, the interconnected pores 106 may exhibit a size variation of about 5% or less. The porous non-refractory alloy structure 104 may include a porosity from about 74% to about 99%, where porosity is defined as the volume fraction of pores and is expressed in terms of a percentage.

The porous non-refractory alloy structures can find use in high temperature applications including, but not limited to, non-refractory thermophotovoltaics, hydrophobic and/or insulating structural coatings, and anti-fouling surfaces. They may also be used for numerous other applications like energy storage (e.g., battery, solar cell, and/or supercapacitor electrodes), catalysis (e.g., catalytic encapsulation), chemical sensing (e.g., detecting gases, sorption, controlled release), MEMS devices (e.g., tuning stiffness and damping), and photonics (e.g., controlling/manipulating light) owing to their high temperature stability, mechanical properties, and periodic nanolattice structure. In one example, the porous nickel-base alloy structures can be used to line the inside of pipes and prevent fouling of the pipes. For example, the aluminized metallic scaffolds may be useful for lining pipes to prevent asphaltenes, which are present in hydrocarbons, from accumulating on inner surfaces of the pipes.

A method of making the aluminized metallic scaffold described herein includes, according to one embodiment, introducing aluminum into a surface of a porous metallic structure at an elevated temperature. The porous metallic structure comprises a transition metal and has a network of interconnected pores extending therethrough, where portions of the porous metallic structure between interconnected pores have a thickness no greater than about 500 nm. As the aluminum is introduced into the surface, diffusion through the porous metallic structure occurs and an aluminide phase is formed in addition to a transitional metal phase. As explained above, the transition metal phase comprises the transition metal and may further include the aluminum in solid solution. Advantageously, the aluminide phase may be distributed throughout the thickness. Thus, a porous non-refractory alloy structure suitable for high-temperature applications is formed. The elevated temperature at which the aluminum is introduced may be in a range from about 500° C. to about 1000° C., depending on the transition metal.

According to another embodiment, the method comprises introducing aluminum into a surface of a porous metallic structure at a temperature of about 700° C. or less. The porous metallic structure comprises nickel and has a network of interconnected pores extending therethrough. As aluminum is introduced into the surface and diffusion occurs, a $Ni_3Al$ phase is formed in addition to a nickel phase. Thus, a porous nickel-base alloy structure suitable for high-temperature applications is formed. Preferably, the $Ni_3Al$ phase is distributed throughout the thickness of the porous nickel-base alloy structure.

The aluminum may be introduced into the surface by pack aluminization or another surface modification technique. Pack aluminization may entail using a pack comprising, in one example, an aluminum source, a halide salt, and aluminum oxide. The aluminum source may comprise an aluminum alloy including from 50% to 99% aluminum or pure aluminum including only incidental impurities. The halide salt may comprise $NH_4Cl$. The halide salt may serve as an activator and the aluminum oxide may act as an inert diluent. All three components may take the form of a powder that can be tumbled together to form a mixture that serves as the pack. The pack may comprise the aluminum source at a concentration from about 5 wt. % to about 30 wt. %; the halide salt at a concentration from about 1 wt. % to about 5 wt. %; and the aluminum oxide at a concentration from about 70 wt. % to about 90 wt. %.

The pack 112 and the metallic scaffold 102 to be aluminized may be placed in a controlled environment 110, such as in a crucible with a gas-tight seal or in a semi-open crucible placed in a furnace under vacuum conditions or inert gas (e.g., He, Ar, or $N_2$) flow. To promote diffusion into the structure, the introduction of the aluminum into the surface of the metallic scaffold may be carried out at an elevated temperature in a range from 500° C. to 1000° C., depending on the transition metal, and more specifically at an elevated temperature of 700° C. or below in the case of nickel (e.g., from 550° C. to about 700° C.). These temperatures may represent the temperature attained by the metallic scaffold itself. Typically, the aluminization of the metallic scaffold 102 is carried out in an inert gas atmosphere. The aluminization process may be carried out for 60 minutes or less, or for 45 minutes or less, and aluminization typically requires at least about 30 minutes at the elevated temperature.

Due to the short diffusion pathways in the fine-scale porous metallic structure 102, no further heat treatments are required after aluminization. Thus, the porous non-refractory alloy structure 104 including the aluminide phase (e.g., $Ni_3Al$) and the transition metal phase (e.g., nickel phase) may be formed in a single-step process. The porous non-refractory alloy structure 104 may have any of the characteristics described in this disclosure. For example, the aluminide phase may be uniformly distributed throughout the porous non-refractory alloy structure 104, where the distribution of the aluminide phase does not exhibit a stepwise gradient as a function of thickness.

As indicated above, prior to aluminization, the metallic scaffold 102 may be fabricated in a deterministic process that leads to a predetermined pore size, shape and periodicity that can be retained through fabrication of the aluminized scaffold 104. Thus, the method may further comprise fabrication of the metallic scaffold, as shown schematically in FIGS. 1A-1C. Prior to introducing the aluminum into the surface of the porous metallic structure 102, a lattice structure or template 120 may be formed from an arrangement of close-packed particles 122, as shown in FIG. 1A, where the particles 122 comprise a polymer or another sacrificial material. For example, polystyrene spheres 122 dispersed in a solvent may be self-assembled on a substrate 116 to form the lattice structure 120 during a solvent evaporation process. Interstices 124 of the lattice structure 120 may then be infiltrated with the transition metal 126, as shown in FIG. 1B, using electrodeposition or another suitable deposition method. The lattice structure 120 comprising the sacrificial material may then be removed by dissolution, etching, decomposition, evaporation, or another removal method. Thus, the porous metallic structure 102 comprising the transition metal and having the network of interconnected pores 106 extending therethrough is obtained, as shown in FIG. 1C. As would be recognized by the skilled artisan, the interconnected pores 106 may have a size and shape determined by the lattice structure 120. After fabrication of the porous metallic structure 102, the interconnected pores 106 may be expanded in size to increase the porosity of the scaffold 102. Pore expansion may be achieved by removing material from the metallic scaffold 102 by chemical etching, electropolishing (electrochemical etching), or anodization followed by chemical etching. A porous metallic structure 102 formed from a close-packed cubic lattice structure may have a porosity of 74%, and this may be increased to 75% or larger, for example from 74% to 99%, by expanding the pores.

Accordingly, the metallic scaffold 102 may have the inverse opal structure shown in FIG. 1D. As described above for the aluminized structure 104, portions of the porous metallic structure 102 between interconnected pores may have a thickness no greater than about 500 nm. Fabrication of the metallic scaffold 102, including formation of the lattice structure or template 120, infiltration of the lattice structure 120 with a transition metal via electrodeposition or other methods, as well as removal of the sacrificial material and other processing steps, are described in several prior patent publications, including: U.S. Pat. No. 7,872,563, "Variably Porous Structures," issued on Jan. 18, 2011; U.S. Pat. No. 8,222,988, "Porous Device for Optical and Electronic Applications and Method of Fabricating the Porous Device," issued on Jul. 17, 2012; U.S. Pat. No. 8,237,538, "Porous Battery Electrode for a Rechargeable Battery and Method of Making the Electrode," issued on Aug. 7, 2012; and U.S. Pat. No. 9,601,234, "Three-Dimensional (3D) Porous Device and Method of Making a 3D Porous Device, issued on Mar. 21, 2017, all of which are hereby incorporated by reference in their entirety.

The aluminized metallic scaffolds 104 of the present disclosure can find use in high temperature applications including, but not limited to, non-refractory thermophotovoltaics, hydrophobic and/or insulating structural coatings, and anti-fouling surfaces. They may also be used for numerous other applications like energy storage (e.g., battery, solar cell, supercapacitor electrodes), catalysis (e.g., catalytic encapsulation), chemical sensing (e.g., detecting gases, sorption, controlled release), MEMS devices (e.g., tuning stiffness and damping), and photonics (e.g., controlling/manipulating light) owing to their high temperature stability, mechanical properties, and periodic nanolattice structure. In one particular embodiment, the alloys can be used to line the inside of pipes and prevent fouling of the pipes. In particular, the aluminized metallic scaffolds could be useful for lining pipes to prevent asphaltenes, which are present in hydrocarbons, from accumulating on the inside of pipes.

EXAMPLES

Example 1. Sample Fabrication

FIGS. 1A-1E provide schematic illustrations of the fabrication process. Tungsten (W) substrates, 0.127 mm in thickness, purchased from Sigma Aldrich, are cleaned by sonication in acetone, isopropanol, and DI water for 15 minutes each prior to use. After drying, the pretreated substrates are placed vertically in a vial containing a suspension of polystyrene spheres (1 μm diameter) in water at 55° C. for deposition. Opal lattice structures 120 are made by self-assembly of polystyrene spheres 122 onto the substrates 116 during solvent evaporation. Electrodeposition is conducted in a commercial electroplating solution (Techni Nickel S, Technic Corp) under a −1.7 V potential against a Pt electrode. The total thickness (or height) of the electrodeposited nickel 126 is controlled by the deposition time. After deposition, the lattice structures 120 are removed completely by immersing the electrodeposited nickel sample in tetrahydrofuran, followed by rinsing with DI water and ethanol before drying. Thus, porous nickel inverse opal (IO) structures 102 are obtained.

Figure 4:
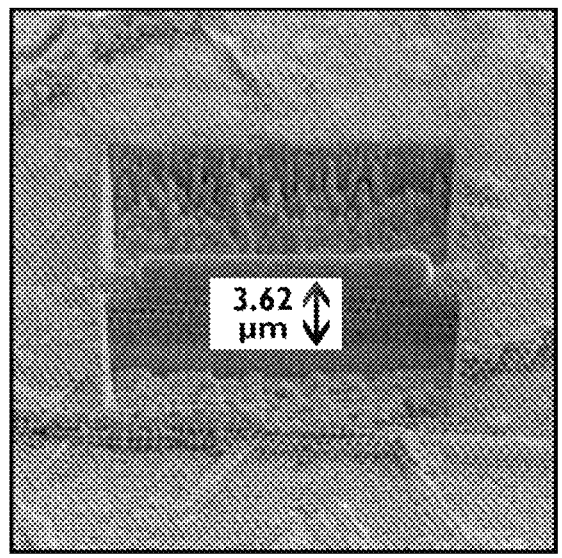
FIG. 4 shows a cross-section of an exemplary aluminized sample revealing the specimen (total) thickness or height which can be controlled through deposition time.

A high activity pack 112 comprising three components is used: 82 wt. % inert $Al_2O_3$ powder (Baikowski, 99.9% pure), 3 wt. % $NH_4Cl$ activator (Alfa Aesar, 99.999% pure), and a 15 wt. % Raney nickel aluminum source (Ni-50 wt. % Al, Acros, 99.99% pure). This pack chemistry is used to ensure a sufficiently high aluminum chloride vapor pressure at a sufficiently low activation temperature to minimize thermal damage caused to the porous nickel IO structures during aluminization. The powders are thoroughly mixed using $Al_2O_3$ ball milling media for 8 hours to ensure homogeneity in the pack 112. The W substrate 116 is used to minimize interdiffusion at the Ni-substrate interface during thermal activation; however, it may be replaced by another conductive material of choice. A protective $Al_2O_3$ cloth 114 is used to avoid direct contact between the porous nickel structure 102 and the pack 112, which reduces the chances of localized melting and sintering of the Raney nickel aluminum source directly to the specimen. Thermal activation is carried out under low $pO_2$ conditions ($10^{-12}$-$10^{-14}$ Pa going into the furnace) in a custom rail furnace under gettered Ar gas at 550° C. for 1 hour to minimize oxidation of the porous nickel IO structures 102 and allow for ample Ni—Al interdiffusion time. A schematic representation of the aluminization process is shown in FIG. 1D and a representative aluminized sample 104 is shown in FIG. 2B. A milled out cross-section of the sample is also shown in FIG. 4 to reveal the tunable specimen total thickness or height, which in this case is around 3.5 μm.

Example 2. Evidence of $Ni_3Al$ Precipitates

Glancing incidence x-ray diffraction (GIXRD) studies are conducted to verify the phases present in the porous nickel IO structures both before and after aluminization and additional heat treatments in a Philips X'Pert 2 Diffractometer. Cu $K_\alpha$ radiation with a 1 mm×3 mm spot size and 1° angle of incidence is used for all the tests. The small incidence angle ensures maximum signal from the porous nickel IO structures while minimizing the signal from the W substrate.

Figure 5:
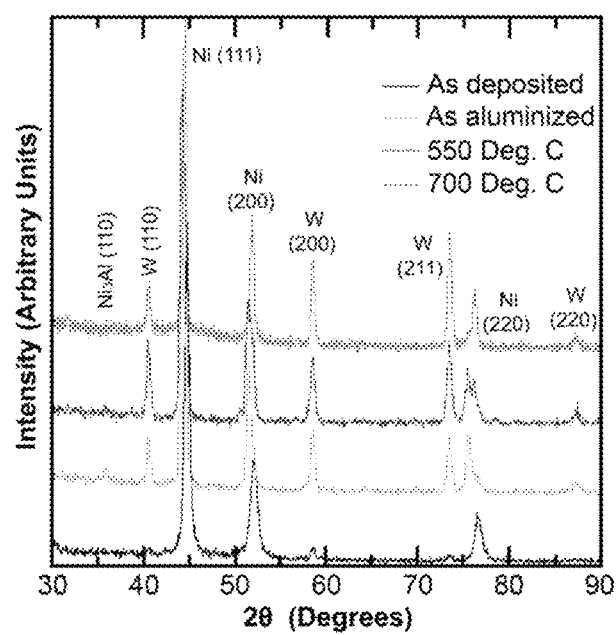
FIG. 5 shows glancing incidence x-ray diffraction patterns (GIXRD) obtained for porous nickel structures before and after aluminization.

GIXRD tests run on the aluminized nickel scaffolds clearly show the presence of the $Ni_3Al$ intermetallic phase, as seen in FIG. 5. A shift in the lattice parameter of the Ni phase ("gamma" phase) towards higher values is also observed, as expected. Similar tests run on the aluminized metallic scaffolds after heat treatments at 550° C. and 700° C. are also shown in FIG. 5. The additional heat treatment at 550° C. caused a slight drop in the $Ni_3Al$ peak intensities which is likely due to homogenization of the aluminized metallic scaffolds, facilitated by inward diffusion of Al. Energy dispersive x-ray spectroscopy (EDS) experiments conducted on the aluminized metallic scaffolds shows the concentration of Al to be 14.8±2.0 at. %, a composition that falls within the Ni—$Ni_3Al$ two-phase region of the Ni—Al equilibrium phase diagram, as can be seen from FIG. 3.

Example 3. Evidence of Improved Thermal Stability

Thermal stability tests are carried out on both nickel scaffolds and aluminized nickel scaffolds under two atmospheres. One is a highly reducing atmosphere including 95 wt. % $N_2$ gas and 5 wt. % $H_2$ gas in order to isolate the impact of temperature on the nickel scaffolds at 550° C. Another is a low $pO_2$ atmosphere with Ar, similar to that used during aluminization, to get a combined effect of temperature and controlled oxidation at 550-700° C. These tests are conducted in a sequential manner in 50° C. increments on the same scaffold. All thermal stability tests are carried out for 1 hour, after which the scaffolds are moved into a cool zone of the furnace with a push-rod system, wherein they are allowed to reach room temperature without changing the atmosphere.

Figure 6:
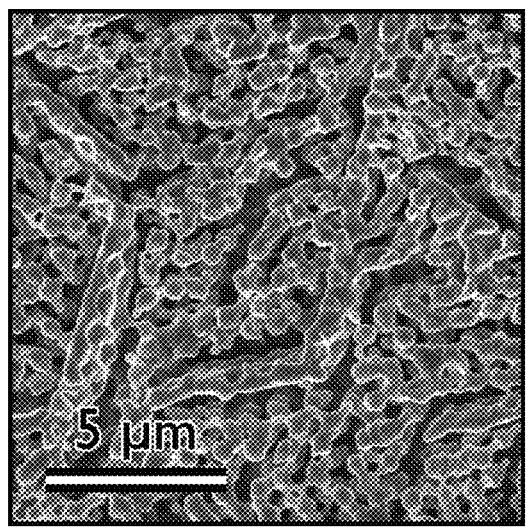
FIG. 6 is a SEM image showing the lack of thermal stability exhibited by a bare (not aluminized) nickel scaffold after annealing at 550° C. in a forming gas atmosphere for one hour.
Figure 7:
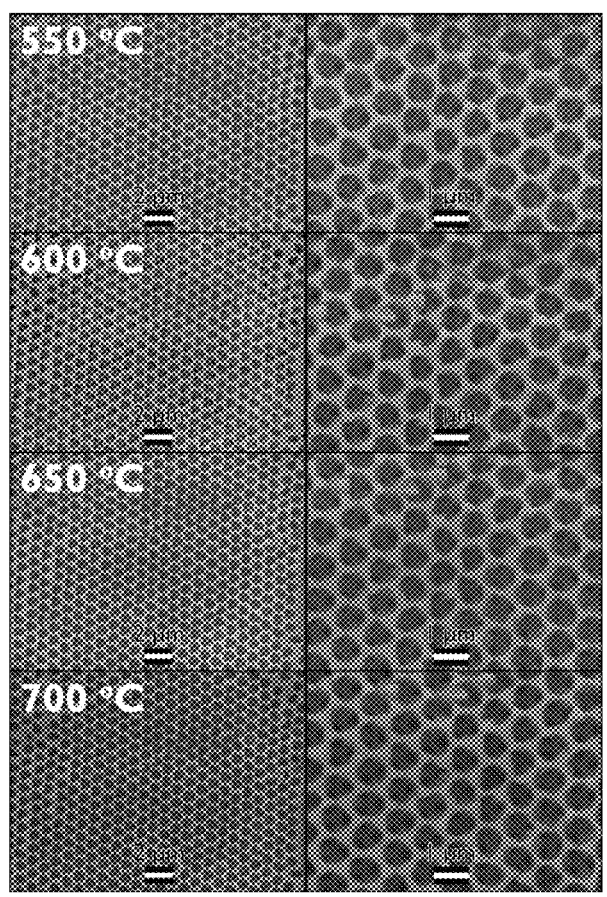
FIG. 7 is a series of SEM images showing an aluminized nickel scaffold after a series of annealing experiments from 550° C. to 700° C. to evaluate thermal stability.
Figure 8:
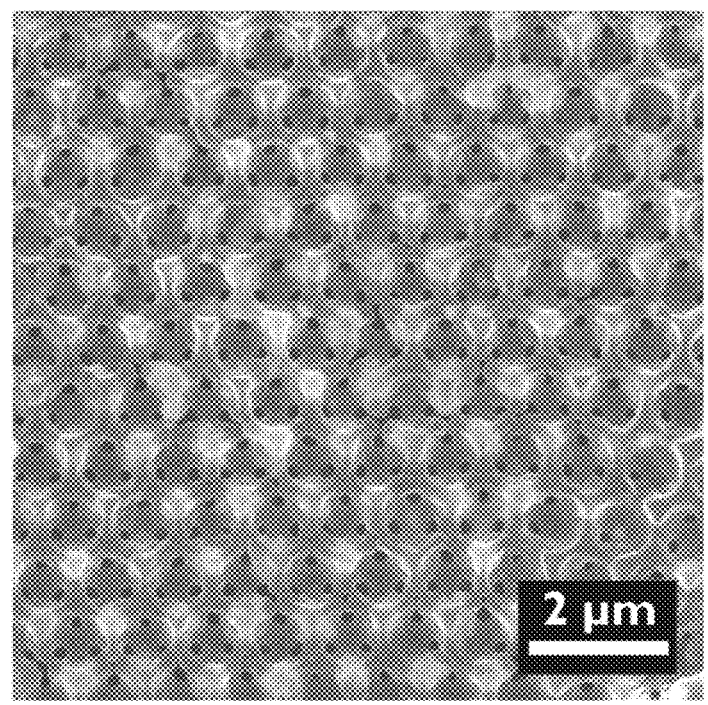
FIG. 8 is a SEM image of part of an aluminized nickel scaffold after annealing at 1000° C. in a forming gas atmosphere for one hour.

The results of thermal stability tests on the nickel scaffolds at 550° C. and a series of images of an aluminized nickel scaffold after sequential heat treatments from 550-700° C. in low $pO_2$ conditions are shown in FIG. 6 and FIG. 7, respectively. A stark contrast in the structural stability of the aluminized nickel scaffolds compared to the (bare) nickel scaffolds is observed. Care was taken to image the same randomly chosen area of the sample after each treatment for direct comparison of the structure of the sample between treatments. With the exception of an increased surface roughness caused by the Al deposition and interdiffusion process, it appears that the structure of the aluminized nickel scaffold remains intact despite the higher temperatures employed. The greatest change in structure is observed after the aluminization process, after which no major change is seen upon subsequent heat treatments at higher temperatures. FIG. 7 shows the result of the aluminized nickel scaffold annealed at 1000° C. for 1 hour. Some structural broadening at the porous nickel structure is noticed as expected due to diffusive transport at this high temperature.

Example 4. Evidence of Improved Mechanical Properties

A Hysitron TI950 Triboindenter is used to perform nanoindentation studies on both bare nickel scaffolds and aluminized nickel scaffolds. A Berkovic diamond tip with a 20 nm radius and a predefined triangular load displacement function with a 1.5 mN maximum load is used for each indent. Care is taken to space the indents sufficiently far (20 μm) from each other on a rectangular grid pattern to avoid any overlap. The indent depth is also ensured to be less than ten times the film thickness (scaffold height) and more than twice the tip radius to avoid substrate effects and other testing artifacts. Twenty indents each are performed on a thick multilayer porous nickel IO structure before and after aluminization. The data are filtered for outliers using the modified Thompson tau technique for the cases when an indent is performed at the boundary of two IO islands to get representative values for both the elastic modulus and hardness of these structures from the unloading load-displacement curves.

Figure 9A:
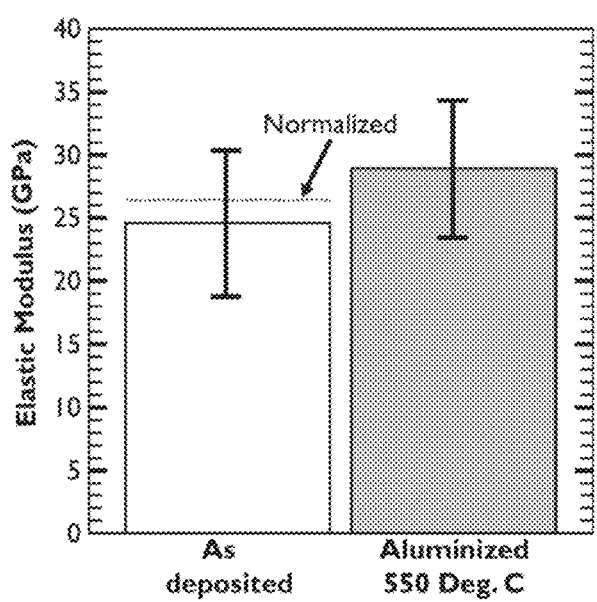
FIG. 9A shows elastic modulus as determined by nanoindentation tests on nickel scaffolds before and after aluminization.
Figure 9B:
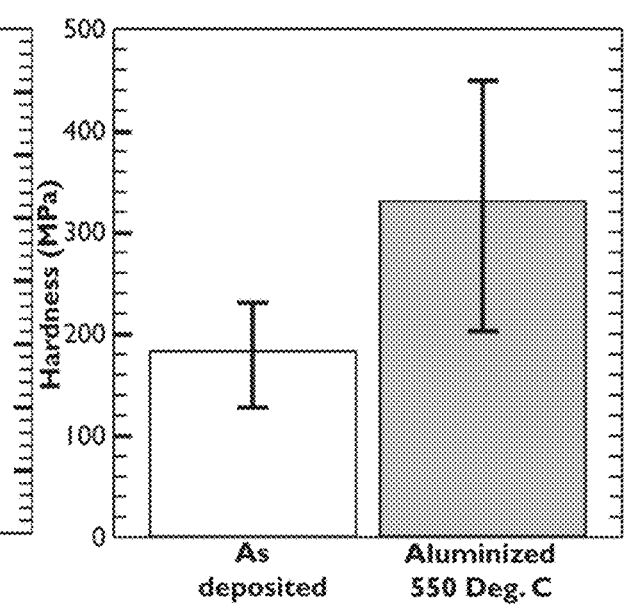
FIG. 9B shows hardness as determined by nanoindentation tests on nickel scaffolds before and after aluminization.

Nanoindentation results on the as-fabricated and aluminized nickel scaffolds are shown in FIGS. 9A and 9B. Elastic modulus values of the 0.22 volume fraction porous nickel IO structures show good agreement with previous literature on using a Poisson ratio of 0.31. A statistically significant increase in both the elastic modulus and hardness of the nickel scaffolds is seen as a consequence of the aluminization process and the concomittant $Ni_3Al$ precipitation hardening mechanism. When compared to the bare porous nickel IO structures, a 17.6% increase is observed in the elastic modulus and an 81.6% increase is observed in the hardness. However, as the volume fraction is not fixed in the two cases, correcting for the increased volume fraction of the aluminized nickel scaffolds (0.2365 volume fraction) still results in an increase in intrinsic strength of the scaffolds by 9.4% in the elastic modulus. Making such a corrected comparison for hardness values is less straightforward due to a lack of previously published hardness data.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. An aluminized metallic scaffold for high temperature applications, the aluminized metallic scaffold comprising:
    a porous alloy structure including a network of interconnected pores extending therethrough, the porous alloy structure comprising a transition metal phase and an aluminide phase, the porous alley structure not including niobium, molybdenum, tantalum, tungsten or rhenium,
    wherein portions of the porous refractory alloy structure between the interconnected pores have a thickness no greater than about 500 nm, and
    wherein the porous alloy structure has an inverse opal morphology.

2. The aluminized metallic scaffold of claim 1, wherein the transition metal phase is selected from the group consisting of: a nickel phase, a titanium phase, an iron phase, a vanadium phase, a chromium phase, and a cobalt phase.

3. The aluminized metallic scaffold of claim 1, wherein the aluminide phase is selected from the group consisting of: a nickel aluminide, a titanium aluminide, an iron aluminide, a vanadium aluminide, a chromium aluminide, and a cobalt aluminide.

4. The aluminized metallic scaffold of claim 1, wherein the porous alloy structure comprises a porous nickel-base alloy structure,
    wherein the transition metal phase comprises a nickel phase, and
    wherein the aluminide phase comprises a $Ni_3Al$ phase.

5. The aluminized metallic scaffold of claim 4, wherein the porous nickel-base alloy structure does not comprise a $Ni_2Al_3$ phase.

6. The aluminized metallic scaffold of claim 1, wherein each of the interconnected pores is about 1 μm or less in lateral size, and wherein the interconnected pores comprise a periodic arrangement.

7. The aluminized metallic scaffold of claim 1, wherein the interconnected pores exhibit a size variation of about 5% or less.

8. The aluminized metallic scaffold of claim 1, wherein the porous alloy structure includes aluminum at a concentration from about 8 at. % to about 25 at. %.

9. The aluminized metallic scaffold of claim 1, wherein the aluminide phase is distributed throughout the porous alloy structure.

10. The aluminized metallic scaffold of claim 1, wherein a distribution of the aluminide phase in the porous alloy structure does not exhibit a stepwise gradient as a function of thickness.

11. The aluminized metallic scaffold of claim 1, wherein the porous alloy structure comprises a hardness at least 80% higher than that of a porous metallic structure consisting essentially of the transition metal phase.

12. The aluminized metallic scaffold of claim 11, wherein the hardness is at least about 250 MPa.

13. An aluminized metallic scaffold for high temperature applications, the aluminized metallic scaffold comprising:
  a porous alloy structure including a network of interconnected pores extending therethrough, the porous alloy structure comprising a transition metal phase and an aluminide phase the porous alloy structure not including niobium, molybdenum, tantalum, tungsten or rhenium,
  wherein portions of the porous alloy structure between interconnected pores have a thickness no greater than about 500 nm, and
  wherein the interconnected pores exhibit a size variation of about 5% or less.

* * * * *